United States Patent [19]

Rickett

[11] 4,412,918

[45] * Nov. 1, 1983

[54] AUTOMATIC AND CONTINUOUS CHEMICAL FEED SYSTEM

[76] Inventor: David A. Rickett, 15600 Del Prado Dr., Hacienda Heights, Calif. 91745

[*] Notice: The portion of the term of this patent subsequent to Sep. 14, 1999, has been disclaimed.

[21] Appl. No.: 354,148

[22] Filed: Mar. 5, 1982

Related U.S. Application Data

[63] Continuation-in-part of Ser. No. 171,983, Jul. 24, 1980, Pat. No. 4,349,437.

[51] Int. Cl.³ .............................................. B01D 33/38
[52] U.S. Cl. .................................... 210/169; 210/172; 210/198.1; 222/420
[58] Field of Search .................. 141/95, 198, 382; 210/753–756, 765, 169, 172, 198.1, 927; 222/14, 420, 526

[56] References Cited

U.S. PATENT DOCUMENTS

| | | | |
|---|---|---|---|
| 618,349 | 1/1899 | Heany | 210/198.1 X |
| 1,342,859 | 6/1920 | Moore | 141/198 |
| 2,400,439 | 5/1946 | Pomans | 210/765 |
| 2,495,937 | 1/1950 | Lawlor | 210/765 |
| 2,541,799 | 2/1951 | White | 210/765 |
| 2,552,491 | 5/1951 | Marks et al. | 210/765 |
| 2,560,317 | 7/1951 | Wallace | 436/125 |
| 3,094,134 | 6/1963 | Currie | 210/198.1 X |
| 3,129,172 | 4/1964 | Dickey, Jr. et al. | 210/169 |
| 3,160,588 | 12/1964 | Alarie | 210/169 |
| 3,212,677 | 10/1965 | Hronas | 222/81 |
| 3,304,564 | 2/1967 | Green et al. | 15/1.7 |
| 3,415,378 | 12/1968 | Fukuda | 210/220 |
| 3,595,395 | 7/1971 | Lorenzen | 210/169 |
| 3,655,054 | 4/1972 | Pansini | 210/169 |
| 3,672,508 | 6/1972 | Simon | 210/169 X |
| 3,712,511 | 1/1973 | Magnasco | 210/169 X |
| 3,760,947 | 9/1973 | Morrison | 210/169 |
| 3,760,981 | 9/1973 | Weed | 222/14 |
| 3,807,434 | 4/1974 | Rasmussen et al. | 210/169 X |
| 4,162,220 | 7/1979 | Serras | 210/927 |
| 4,278,084 | 7/1981 | Pope, Jr. | 210/927 |
| 4,303,515 | 12/1981 | Rademacher | 210/169 |
| 4,349,437 | 9/1982 | Rickett | 210/169 |

FOREIGN PATENT DOCUMENTS 1245005  9/1960  France ............................ 210/198.1

OTHER PUBLICATIONS

Streeter, U.L., Fluid Mechanics, 1966, pp. 211–222.

Primary Examiner—Robert H. Spitzer
Attorney, Agent, or Firm—Lyon & Lyon

[57] ABSTRACT

An automatic and continuous chemical feed system for the introduction of a chemical solution into a liquid body. The system comprises a vessel for containing the chemical solution, a means for filtering the solution as it flows out of the vessel, a downcomer means having an inner diameter sufficiently large to spontaneously vent any gases which are formed in the solution back through the filter means and into the vessel, an adjustable standpipe means to regulate changes in the flow of the solution, a tubular connecting means to connect the downcomer means and the standpipe means and which initially determines the flow rate of the solution, and a tubular conveyance means attached to the standpipe to convey the chemical solution to a selected location in or above the liquid body. Once the vessel has been filled with the chemical solution, the flow of the solution is automatic and continuous. The effective flow rate can be varied by changing the height of the tubular connecting means in the standpipe means; the length and/or the diameter of the tubular connecting means; the height of the liquid in the container; and the concentration of the chemical solution. And anticlogging nozzle may be attached to the tubular conveyance means to permit the introduction of a scale-forming chemical solution below the surface level of the liquid body.

14 Claims, 4 Drawing Figures

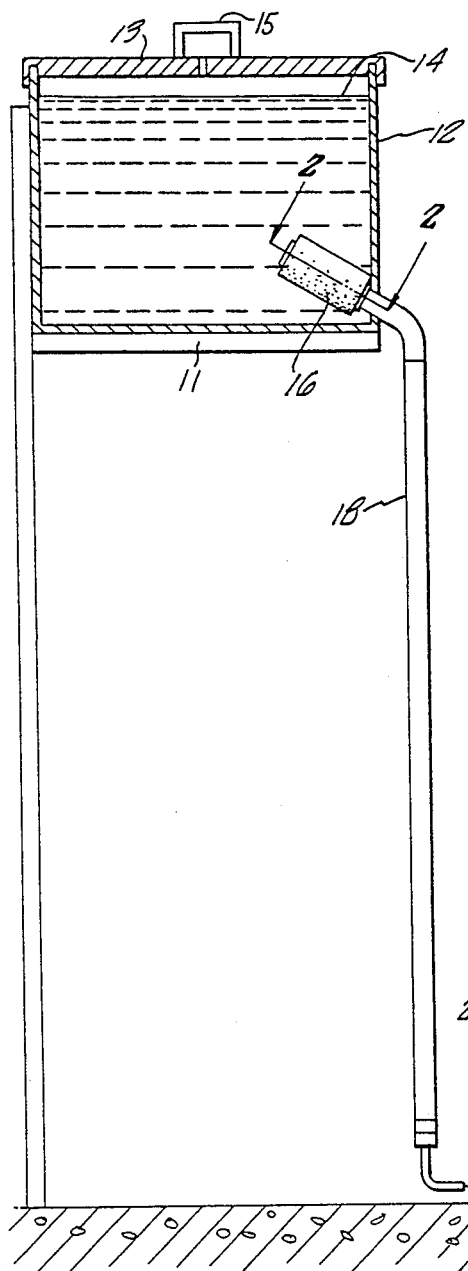
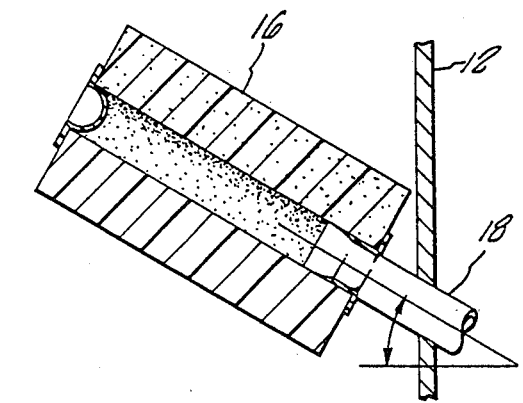
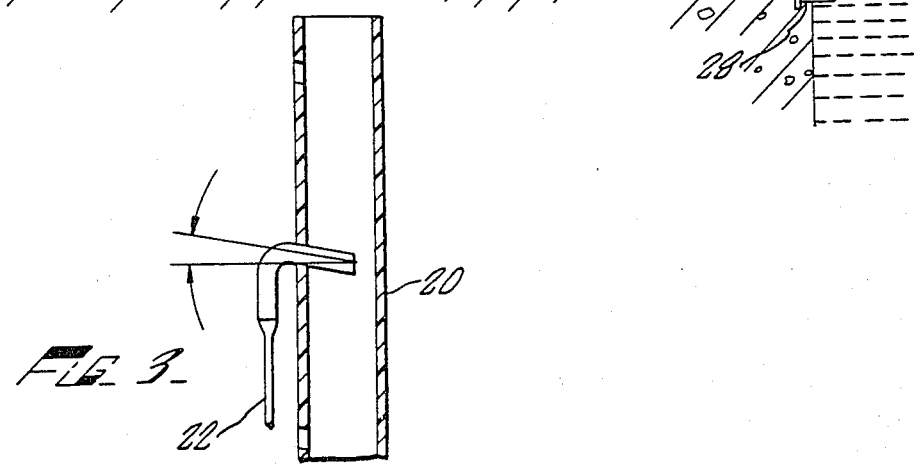

AUTOMATIC AND CONTINUOUS CHEMICAL FEED SYSTEM

CROSS-REFERENCE TO RELATED APPLICATIONS

This application is a continuation-in-part application of Ser. No. 171,983 filed July 24, 1980 now U.S. Pat. No. 4,349,437, entitled "Automatic & Continuous Chemical Feed System", which is related to application Ser. No. 819,966, filed on July 28, 1977, by David A. Rickett, previously abandoned.

BACKGROUND OF THE INVENTION

The present invention is directed to an automatic and continuous chemical feed system for the introduction of a chemical solution into a liquid body. More speciffcally, the chemical feed system of the present invention is particularly adapted for the introduction of chlorine, acid, and other water treatment chemical solutions into a swimming pool.

Large bodies of water, such as swimming pools, are generally continuously plagued with such problems as the continuous growth of algae and bacteria, and scaling. This growth and scaling is normally impeded by the addition of such chemicals as chlorine, various acids, bases or other liquid chemicals to control pH, biocides, or other water treatment chemicals, to the liquid body. Generally, these chemical solutions have been added to the liquid body by hand each time that the chemicals are required. However, such methods are inconvenient and often time-consuming. Alternatively, the chemical solution has been directly injected into the liquid body, but only by means of special and expensive chemical injection pump systems.

Moreover, while these chemical solutions typically successfully inhibit the growth of algae and bacteria, and reduce scaling, their addition to the liquid body normally results in a temporary increase in the concentration of that chemical in the liquid body. Thus, for example, the addition of large amounts of chlorine to a swimming pool causes the water to be temporarily unsuitable for swimming. Further, many of these chemical solutions, such as chlorine, are destroyed or are rendered inactive by sunlight. Consequently, it is necessary to add these chemical solutions to a swimming pool on a regular and routine basis, oftentimes inconveniencing the pool owner.

In contrast, the chemical feed system of the present invention enables a chemical solution to be introduced into a liquid body, such as a swimming pool, automatically and continuously without inconveniencing the owner or restricting the use of the pool.

SUMMARY OF THE INVENTION

The present invention provides a chemical feed system which automatically and continuously introduces a chemical solution into a liquid body such as a swimming pool. The chemical feed system of the present invention is particularly suitable for the introduction into a swimming pool of non-saturated chemical solutions containing chemicals designed to treat the water, such as sodium hypochlorite, muriatic acid, sulfuric acid, bromine chloride, a solution of iodine, bromine, di- or tri-chlorotriazinetrione, cyanuric acid, sodium bisulfate, sodium carbonate, and similar chemicals to control the pH of the liquid body and the growth of algae or bacteria and the like.

The chemical feed system comprises a vessel for containing the chemical solution, a means for filtering the chemical solution as it flows out of the vessel, a downcomer means connected to the filter means and having an inner diameter sufficiently large to spontaneously vent any gases which are formed in the chemical solution back through the filter means and into the vessel, an adjustable standpipe means to regulate change in the flow of the chemical solution, a tubular connecting means which initially determines the flow rate of the solution to connect the downcomer means and the standpipe means, and a tubular conveyance means attached to the standpipe means to convey the chemical solution to a selected location in the liquid body.

The filter means removes any plug-forming materials which may contaminate those chemicals which are commercially available for the treatment of swimming pools. The downcomer means ensures the availability of maximum head pressure to sustain the flow of the chemical solution for those solutions which may partially decompose into a gas. The standpipe means provides a simple method for quickly changing the flow rate of the chemical solution without changing the length and/or the diameter of the tubular connecting means. In addition, an anticlogging nozzle may be attached to the tubular conveyance means to permit the introduction of a scale-forming chemical solution below the surface level of the liquid body. Once the flow of the chemical solution in the system has been initiated by completely filling the vessel with the solution and fully "wetting" the filter means, the flow of the chemical solution is continuous and automatic. The rate of flow can be varied by changing the height of the tubular connecting means in the standpipe means, the length and/or the diameter of the tubular connecting means, and/or the height of the liquid solution in the vessel. The concentration of the chemical solution can also be altered to accomplish an effective change in the flow rate.

Accordingly, it is an object of this invention to provide an automatic and continuous chemical feed system for the introduction of a chemical solution into a liquid body.

It is another object of this invention to provide an automatic and continuous feed system for adding chemical solutions to swimming pools which is inexpensive and requires a minimum of maintenance.

It is still another object of this invention to provide an automatic and continuous chemical feed system which filters the chemical solution to remove any plug-forming materials and which spontaneously vents any gases formed in the chemical solution back through the filter means and into the vessel containing the chemical solution.

It is a further object of this invention to provide an automatic and continuous chemical feed system which contains a standpipe means to easily and quickly regulate changes in the flow of the chemical solution.

The manner in which these and other objects and advantages of this invention are achieved will become apparent from the detailed description of the invention which follows and from the accompanying drawings which illustrate a preferred embodiment of the automatic and continuous chemical feed system of the present invention.

BRIEF DESCRIPTION OF THE DRAWINGS

FIG. 1 is a perspective view showing the principal elements of a preferred embodiment of the automatic and continuous chemical feed system of the present invention.

FIG. 2 is an expanded cross-sectional view along line 2—2 of FIG. 1 of the filter means of the chemical feed system.

FIG. 3 is an expanded cross-sectional view along line 3—3 of FIG. 1 of the standpipe means of the chemical feed system.

DETAILED DESCRIPTION OF THE INVENTION

Figure 4:
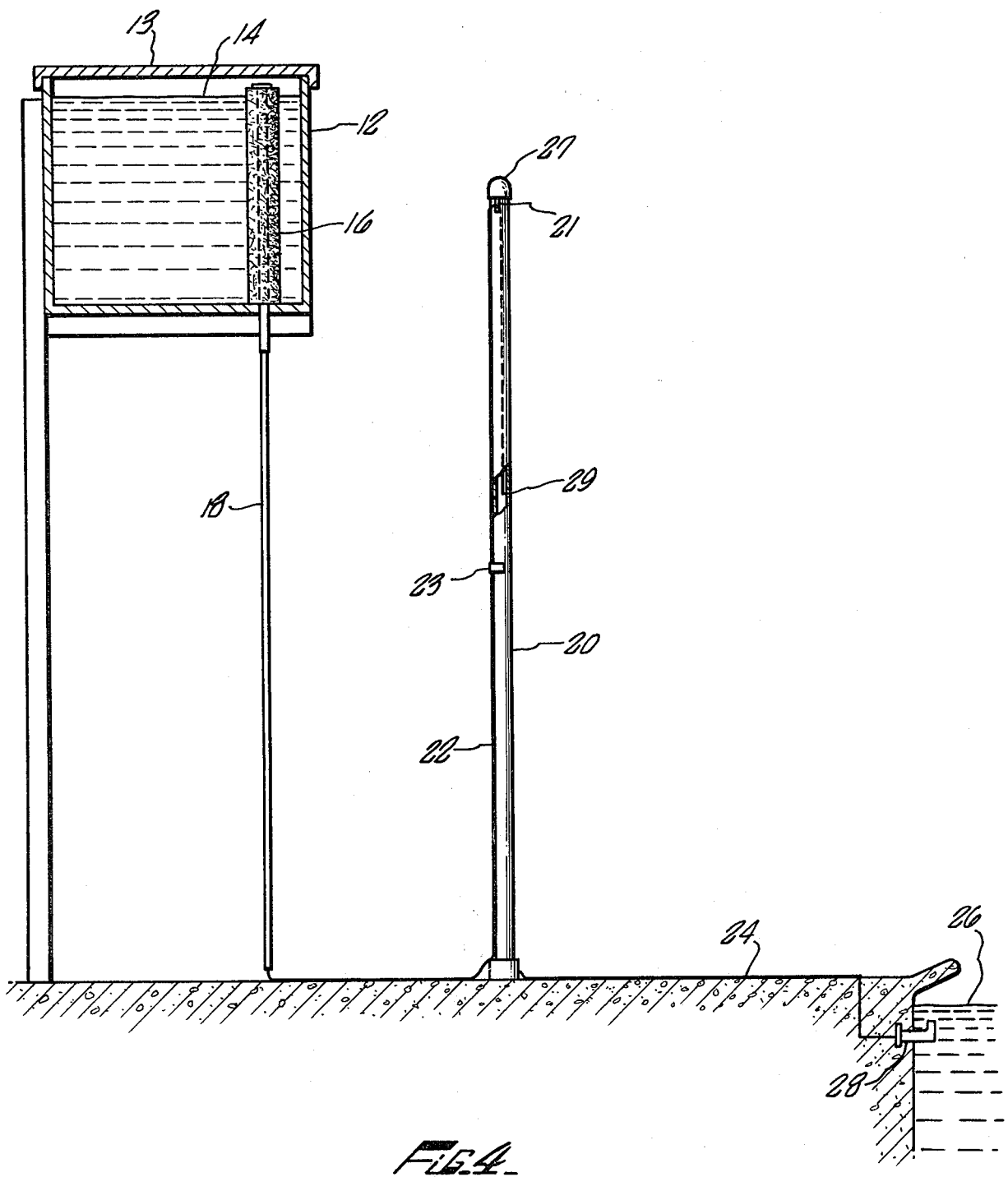
FIG. 4 is a perspective view showing an alternate preferred embodiment of the chemical feed system of the present invention.

Turning in detail to the drawings, FIG. 1 shows a chemical feed system comprising generally a vessel 12 for containing the chemical solution 14, a filter means 16 for filtering the chemical solution as it flows out of the vessel, a downcomer means 18 having an inner diameter sufficiently large such that any gases formed in the chemical solution are spontaneously vented back through the filter means and into the vessel, an adjustable standpipe means 20 which permits the flow rate of the chemical solution to be quickly and easily changed, a tubular connecting means 22 to connect the downcomer means and the standpipe means and which initially controls the flow rate of the solution, and a tubular conveyance means 24 to convey the chemical solution to a selected location in or above the liquid body 26. The tubular conveyance means may have an anti-clogging nozzle 28 attached thereto.

The vessel 12 may be of any suitable material which is impervious to liquids and chemically resistant to water treatment chemicals, e.g., plastic. The vessel material must also be sufficiently rigid so that it is stable when positioned upon a fixed support above the ground and filled with the chemical solution. A particularly preferred material due to its cost and durability is a polyethylene plastic approximately 75 mils. thick, and a suitable vessel of this material can be purchased from Roper Plastics, Inc., at 15510 Blackburn Ave., Norwalk, Calif. 90650, under the name "Saturn container and cover."

The vessel is also preferably provided with a cover 13 which acts as a sunshade to impede the sun from degrading the chemical solution, prevents any contaminants from entering the vessel, and reduces evaporation of the chemical solution. The cover may be internally recessed so that condensation will drain back into the vessel, and is provided with a vent to maintain atmospheric pressure as the solution flows out of the vessel and to permit gases which form in the chemical solution to escape. The vessel may also be of any desired size; however, it has been found that a capacity of approximately 5 gallons provides the desired efficiency with minimum inconvenience. A handle 15 may also be attached to the vessel for ease of handling. The vessel is fixably positioned above the ground, preferably resting upon a support means 11, such as a secured platform. It has been found that a height above the ground of approximately 42 inches provides optimum convenience and flow control where the swimming pool or spa or similar liquid body is built below the ground. In addition, it should be pointed out that since the chemical feed system of the present invention is capable of providing flow rates as low as a fluid ounce or less per day, only a small differential head is required. Consequently, the position of the vessel not only may vary considerably, depending upon the location of the particular pool or spa, but the vessel may be positioned at a height at or only a few inches above the high water level in the liquid body when such low flow rates are desired.

Inside the vessel is a filter means 16 which is adapted to remove from the flow of the chemical solution any plug-forming materials which often contaminate the chemicals which are commercially available for the treatment of swimming pools. Any suitable type of filtering means, including a filter cartridge, may be used. However, preferably the filtering means comprises a dual plug sealed $12'' \times 2\frac{1}{2}'' \times 1''$ polypropylene 25–50 micron medium density or a $10'' \times 2\frac{1}{2}'' \times 1''$ polypropylene 50–75 micron coarse density filter cartridge. The filter's density must be such that any particles which pass through the filter are considerably smaller in size than the inner diameter of the tubular connecting means. Such filter cartridges can be obtained from Ryan Herco Products Corp. at 2509 North Naomi in Burbank, Calif., under the name "polypropylene web cartridge". Other filter sizes may be used in the present invention, and particularly those about 5" in length, but the longer lengths of at least about 10" or 12" are preferred to facilitate the refilling and repriming of the chemical feed system when the vessel has drained substantially dry. In addition, a larger filter also provides a larger capacity, reduces the frequency of replacement and is easier to replace.

The filter cartridge is plugged at both ends with any suitable material. However, one of the filter plugs may be eliminated if the filter is of sufficient length, e.g., as long as the vessel is high, so that its upper end remains above the level of the chemical solution in the vessel. A round and smooth hole is drilled through the plug which will be at the bottom of the filter, the diameter of the hole being slightly smaller than the outer diameter of a flexible plastic tubing which is to be tightly inserted through the hole and into the filter. Preferably, the flexible plastic tubing is a plasticized polyvinyl chloride tube about 2 to 4 inches in length with an inner diameter of about $\frac{3}{8}''$ and an outer diameter of about $\frac{1}{2}''$. The hole which is drilled in the plug is preferably about 33/64Δ. A short piece of tubing, preferably a piece of the downcomer means is inserted inside the flexible tubing to slightly increase its outer diameter so that a tight seal is formed between the flexible tubing and the plug. The filter means is positioned in the vessel at an angle from the horizontal to aid in venting gases which are spontaneously formed in the solution due to its decomposition. Preferably, the filter means is positioned at an angle of at least about 30° from the horizontal, and more particularly is positioned at a substantially vertical orientation to improve gas venting. A longer filter which is vertically oriented also requires a lower refill height in the vessel to reprime the system.

The remaining end of the flexible plastic tube extends through a small hole which penetrates either the bottom of the vessel or approximately one inch above the base of the vessel as shown in FIG. 1. The diameter of the hole is just slightly larger than the outer diameter of the flexible plastic tubing, e.g. about 33/64" in diameter where the flexible plastic tub has an outer diameter of about $\frac{1}{2}''$ since inserting the downcomer means into the flexible plastic tube slightly increases its outer diameter and achieves a tight seal. The flexible plastic tube is connected to the downcomer means in such a fashion to form a strong and durable leak-tight seal. Preferably, the connection between the downcomer means and the flexible plastic tubing is much stronger than the connection between the filter and the lower filter plug so that the filter can be easily replaced by twisting and pulling it off of the plug, which remains connected to the flexible plastic tube, and inserting a new filter onto the plug. If the hole penetrates the bottom of the vessel, the downcomer means may be inserted directly through the hole approximately ½" to ¾" into the vessel to further enhance the strength and durability of the seal. In such cases the support means must provide a means, such as an opening therein, to allow the downcomer means to pass through and into the vessel as shown in FIG. 4.

The downcomer means 18 is a tube preferably of a plastic material, such as polyethylene, having a length which is consistent with the height of the vessel's position above the ground or high water level of the liquid body and extends from the fixed support means 11 to the ground, e.g., about 42" in length when the vessel rests upon a secured platform which is elevated approximately 42" above the ground. Downcomer means having a length of 12" have been used successfully with above the ground pools and spas where the base of the vessel has been set at the high water line of the pool or spa. It is imperative that the inner diameter of the downcomer means is sufficiently large to spontaneously vent back through the filter means any gases which are formed in the chemical solution. In this manner, the downcomer means assures the continuous availability of maximum head pressure to facilitate the flow of a chemical solution, such as sodium hypochlorite, which may decompose partially into a gas. It has been found that an inner diameter less than ¼" will not successfully continue to spontaneously vent any gases which are formed during the flow of the chemical solution. Preferably, the inner diameter is at least 5/16" with an inner diameter of ⅜" preferred to allow for tubing constriction during the assembly of the chemical feed system. In addition, the inner and outer diameters of the downcomer means are preferably approximately the same as the flexible plastic tubing so that a liquid-tight seal may easily be obtained when they are connected.

The standpipe means 20 is a rigid tubing, preferably of a plastic material such as polyvinyl chloride, e.g., Class 125 white polyvinyl chloride pipe which is obtainable from any irrigation supply store. The standpipe means is capped at its lower end and extends vertically upwards preferably about 48" in length and has an inner diameter of about ½". Changes in the rate of flow of the chemical solution can be regulated by means of a series of holes which are drilled at various heights in the upper three-quarters of the standpipe tubing. The holes are preferably drilled on 3" centers and have a diameter of about 0.122". Moreover, the holes are drilled at an angle of about 10° from the horizontal to aid the flow of the chemical solution as shown in FIG. 3. This causes the chemical solution to either fall straight down the opening of the standpipe, or to flow down the side opposite the openings. Alternately, a long vertical slot 21 about 1" in length and slightly wider than the outer diameter of the tubular connecting means may be placed at the top of the standpipe as shown in FIG. 4. Such an embodiment eliminates the need for the holes in the standpipe tubing, thereby further reducing fabrication cost and reducing the possibility of spillage in the event that the tubular conveyance means becomes plugged. A cap 27 may be slipped over the top of the standpipe means. The open end of the tubular connecting means 29 is placed through the slot and down into the standpipe the desired length. The vertical height of the open end of the tubular connecting means above the lower end of the standpipe means may be simply and easily varied by increasing and decreasing the length of the tubular connecting means which is inserted into the standpipe means through slot 21. The tubular connecting means is held in place on the outside of the standpipe means, such as by a spring clamp 23 which can be of the same material as the standpipe means. It should be noted that the siphon which is formed by the high point of the tubular connecting means in slot 21 in this embodiment does not create a potential for gas binding since the extremely small inner diameter of the tubular connecting means insures that any gas bubbles present in the chemical solution at this point will flow with the liquid.

The tubular connecting means 22 connects the downcomer means and the standpipe means and initially determines the flow rate of the solution by virtue of its length and inner diameter which are selected so as to permit the flow rate to be adjusted without the necessity of stopping the flow of the chemical solution and changing the length and/or inner diameter of the tubular connecting means. Any suitable flexible plastic tubing may be used; however, it is preferred that a polyethylene tube having an outer diameter of about 0.080" and an inner diameter of about 0.040" with a length of approximately 15 to one hundred feet is utilized. The inner diameter of the tubular connecting means may, however, vary from 1/32" to 1/16", while the length may range from 5 feet to 500 feet. The very narrow inner diameter is necessary to restrain the flow of the chemical solution so that flow rates as low as a fluid ounce or less per day may be obtained, but the inner diameter must also be large enough to avoid plugging and to permit a flow rate of several gallons per week with the available pressure head if desired. Changes in the flow rate from a few ounces or less per day to several gallons per week can be easily accomplished by changing the position of the tubular connecting means in the standpipe means rather than changing the length and/or the diameter of the tubular connecting means each time a change is desired. The tubular connecting means is preferably connected to the downcomer means through the use of a plug which is inserted into the lower end of the downcomer means and which has a flexible plastic tube inserted through a hole which has been drilled in the plug. If the downcomer means has an inner diameter of ⅜", the plug is a preferably short cylindrical piece of polyvinyl chloride which is ⅜" in length with an outer diameter slightly larger, or about 0.015" larger, than ⅜" and which has a hole preferably about 0.128" in diameter drilled therethrough. The flexible plastic tube is preferably about 2" to 4" in length with an outer diameter of ⅛" and an inner diameter of 1/16". A semi-rigid polyethylene tube about ½" in length and having an inner diameter of about 0.040" and an outer diameter of about 0.080" is inserted into the flexible plastic tube to slightly increase the outer diameter of the flexible plastic tube before the plug is pulled thereover to insure that the opening in the flexible plastic tube does not become clogged. The tubular conveyance means is inserted into the remaining end of the flexible plastic tube, and a polyethylene ring having an inner diameter of about ⅛" and an outer diameter of about 3/16" may be slid thereover to maintain the connection. If the standpipe means having a series of holes drilled therein is used, the remaining end of the tubular connecting means preferably terminates in a short, about 2" long, piece of flexible tubing, 1/16" by ⅛", which is inserted through one of the holes in the standpipe means as shown in FIG. 3. Suitable tubular materials as described may be obtained from the Ryan Herco Products Corp.

The tubular conveyance means 24 is attached at one end to the standpipe means, and the remaining end conveys the chemical solution to a selected location in the liquid body. The inner diameter of the tubular conveyance means must be large enough not to affect the rate of flow of the chemical solution, but small enough to insure that any gases will flow with the liquid and not collect in high spots. Preferably, the inner diameter is about 3/16". A hole is drilled above the base of the standpipe means through the cap, and the conveyance tube is secured therethrough. The hole may preferably be about 9/32" in diameter and is drilled about ¾" above the base of the standpipe. Two chemical feed systems as disclosed herein may be utilized at the same time by means of a Y-shaped tubular conveyance tube, each arm of the Y being connected to a different chemical feed system which may contain either the same or different but compatible chemical solutions.

The tubular conveyance means permits the chemical solution to be injected at a selected location, such as through the skimmer as shown in FIG. 1, or it may terminate above or below the surface of the water. An anti-clogging nozzle 28 may be utilized where a scale-forming chemical is to be injected below the water surface level in a pool. As shown in FIG. 1, such an anti-clogging nozzle may be a 90° elbow which is attached and sealed at one end to the tubular conveyance means while the other end of the elbow is oriented in an upward direction with the plane of the opening therein being horizontal to the surface of the liquid body. When the anti-clogging nozzle is oriented in this fashion, it remains filled with a chemical solution which has a higher density than the water. As a result, the water and the solution interface is at the horizontal plane at the head of the nozzle rather than inside the nozzle, thus minimizing the formation of the scale inside the nozzle. The open end of the anti-clogging nozzle is much also larger than the inner diameter of the tubular conveyance means in order to maintain a smooth flow and to facilitate cleaning. Preferably, the opening varies from about ¼" to about 1½" depending upon the time desired between cleaning.

It will be obvious to those skilled in the art that any suitable inert plastic materials may be utilized in the practice of the present invention. However, the particular plastic material described for each of the parts of the chemical feed system has been found to perform satisfactorily while minimizing the cost of materials. In addition, the plastic materials may be black pigmented in order to protect the material as well as the chemical solution from sunlight. Moreover, it should be pointed out that the particular type of connections described or the stated dimensions of the connecting pieces are not themselves critical. Commercially available compression or bulkhead connections known in the art may be used, but such relatively complex and expensive devices are not necessary due to the low pressures in the chemical feed system of the present invention. It is, however, important that none of the connections leak, that they be easy to assemble, and that they can not be easily pulled apart although they can be disassembled. In this regard, it has been found that placing a light coating of a light, non-solvent oil, such as WD-40, along the outside of the tube which is inserted into another tube or plug will facilitate making the connection. The oil appears to be subsequently absorbed or displaced and a partial adhesion forms between the parts. As a result, more force is required to pull the parts apart than was necessary to assemble them. The connections described are particularly effective because they contain a flexible tube between two semi-rigid materials, and are low cost, leak tight, and resist accidental pull-out.

The chemical feed system of the present invention is preferably positioned adjacent to the liquid body, such as near the pump, filter and/or heater equipment of a swimming pool. The tubular conveyance means may be routed through existing open deck joints where available to avoid having the tubing exposed on the deck surface, or through ducts provided for such purpose. Operation of the chemical feed system must first be initiated by filling the vessel with water or similar cleansing liquid in order to begin flow through the dry filter and to flush the system of any contamination. If a coarse polypropylene filter about 10" in length is used, approximately 6" of head in the vessel is necessary to penetrate the filter and initiate flow, while about 8" to 9" of head is necessary where a medium density filter about 12" in length is used. Once the filter cartridge has been fully wetted, the flow will automatically continue when the vessel is less than completely full. The water or other liquid is then emptied from the vessel which is then refilled with the desired concentration of the chemical solution to be introduced into the liquid body. Examples of common chemicals typically used in treating swimming pools include sodium hypochlorite, muriatic acid, sulfuric acid, bromine chloride, a solution of iodine, bromine and di- or tri-chloro-triazinetrione, cyanuric acid, sodium bisulfate, sodium carbonate and similar biocides, pH control or other water chemicals known to those who maintain swimming pools. Should the vessel ever become substantially empty (a low residual solution level normally remains in the vessel and keeps the filter in a semi-wet condition), the chemical feed system can be easily and conveniently reprimed by unskilled and unsupervised persons by merely refilling the vessel. No mechanical adjustments or changes are generally necessary. For optimum operation, it is important that the tubular connecting means not be permitted to extend much below the base of the downcomer means, and that the slack portion be coiled in a horizontal plane at or above the base of the downcomer means. Normally, the non-slack portion of the tubular connecting means is positioned to remain in a generally vertical orientation between the low point of the downcomer means and the highest point of the vessel to insure repriming of the system by only adding solution to the vessel.

In general, the amount of the chemical solution required for the proper maintenance of a liquid body, such as a swimming pool, is dependent upon the size of the liquid body, the general weather and insolation conditions, the use of the liquid body, and the quality of the fill water. Moreover, changing the concentration of the chemical solution enables the actual amount of the pertinent chemical which is added to the liquid body to be varied. Thus, while the flow of the chemical solution out of the chemical feed apparatus of the present invention is continuous and automatic, the flow rate may be easily regulated to maintain a substantially uniform desired rate of flow to ensure that the proper amount of the chemical solution is being discharged into the liquid body. In particular, the rate of flow may be varied by changing the height of the tubular connecting means in the standpipe means, by changing the height of the chemical solution in the container, or by changing the length and/or the diameter of the tubular connecting means. In addition, the concentration of the chemical solution can be altered to accomplish an effective change in the flow rate.

Consequently, the flow rate can be calculated as follows:

$$G = \frac{H \times S \times d^4}{6.31(10^{-4})Lu}$$

where:
- u = absolute viscosity, cp
- L = length of the tubular conveyance means, feet
- S = specific gravity of the chemical solution
- H = head (net difference in height between the height of the liquid solution in the vessel and the height of the tubular conveyance means in the standpipe means)
- d = inside diameter of tubular convenance means, inch
- G = flow rate, gpm (8 fluid oz/day = $4.34 \times 10^{-5}$ gpm)

Thus, the flow rate for a chemical feed system having a head of two feet, corresponding to a 2-foot difference between the height of the chemical solution in the container and the position of the tubular conveyance means in the standpipe means, a tubular conveyance means with an inner diameter of 1/32 of an inch and a length of 40.6 feet, and dispensing muriatic acid (31.5% HCl) having a specific gravity of 1.16 and a viscosity of 2 cp, is as follows:

$$G = \frac{2 \times 1.16 \times (1/32)^4}{6.31 \times (10^{-4}) \times 40.6 \times 2} = 4.32 \times 10^{-5} \text{ gpm}$$

$$= 8 \text{ ounces/day}$$
$$= 1 \text{ cup/day}$$

As can, therefore, be seen from the above calculations, the flow rate can be easily and readily adjusted by merely adjusting the height of the liquid solution in the container or the position of the tubular conveyance means in the standpipe means (H), or by varying the length of the tubular conveyance means (L). However, since only a very low head is necessary to provide flow rates of a fluid ounce or less per day, the flow rate can easily and more conveniently, be altered by merely changing the level of the liquid solution in the vessel. For example, during summer when a higher flow rate is desirable, by increasing the level of the solution in the vessel from 2" to 8", the flow rate will increase by a factor of 4.

Since the flow rate can be calculated in 8 ounce cups/day as shown:

$$G = H/L \times 20.21 \text{ (1/32 inch inside diameter)}$$

the flow rates for various lengths and heads are as follows:

| Flow Rate (in 8 oz. cups) | | | | | |
|---|---|---|---|---|---|
| | | | L (in ft) | | |
| | | 10 | 20 | 30 | 40 | 50 |
| H (in ft) | 1 | 2.0 | 1.0 | 0.7 | 0.5 | 0.4 |
| | 2 | 4.0 | 2.6 | 1.3 | 1.0 | 0.8 |
| | 3 | 6.1 | 3.0 | 2.0 | 1.5 | 1.2 |
| | 4 | 8.1 | 4.0 | 2.7 | 2.0 | 1.6 |
| | 5 | 10.1 | 5.1 | 3.4 | 2.5 | 2.0 |

Preferably, the flow rate is maintained from about 1 to about 80 fluid ounces per day, depending upon the size of the liquid body and the chemical solution being introduced therein. The tubular conveyance means discharges directly into the liquid body. The discharge may be above or in the liquid body. Chemical solutions of low concentration may be discharged directly into a skimmer area or into a flush wall nozzle depending upon the chemical compatibility of the material from which the container holding the liquid body is made. Chemical solutions of high concentration and those chemical solutions containing chemicals which may lead to the staining or attack of the walls of the container holding the liquid body may be discharged away from the walls of the container. The chemical solution is dispersed throughout the liquid body by the natural circulation of the liquid. No mechanical circulation of the liquid is required although such a circulation system may be advantageously used. When using a chemical solution having a high pH, such as sodium hypochlorite, the discharge may be through an anti-clogging nozzle to control scale formation and facilitate cleaning. The scale which forms tends to be soft and porous, and while the scale may not appear to impede the flow rate, its continued formation may interrupt the flow of the chemical solution. When an anti-clogging nozzle as shown in FIG. 1 is utilized, the scale forms around the periphery of the elbow thereby tending to leave the passageway through the elbow, unplugged and facilitating easy cleaning.

The chemical feed system as disclosed herein provides a simple and reliable apparatus for the automatic and continuous introduction of a chemical solution into a liquid body with predictable and adjustable results. In particular, the daily testing and addition of chemicals required in the maintenance of a home swimming pool is eliminated. For example, when the chemical feed system is filled with a chlorine solution to be added to a swimming pool or spa, the pool will stay sanitary and clear without any temporary interruptions in the use of the pool, and the chlorine solution in the vessel need be replenished only about every week, depending, of course, on the size of the pool. Consequently, the inconvenience and time-consumption is reduced, as well as the cost of maintenance.

While the preferred embodiment and application of this invention has been shown and described, it would be apparent to those skilled in the art that many more modifications are possible without departing from the inventive concept herein described.

I claim:

1. An automatic and continuous chemical feed system for the introduction of a chemical solution into a liquid body comprising:
   a vessel vented to maintain atmospheric pressure which contains the chemical solution to be introduced into the liquid body, said vessel being fixably positioned such that the level of the chemical solution in the vessel is above the high liquid level of the liquid body, and said vessel having an opening near the base thereof;

a means for filtering said chemical solution as the solution flows out of the vessel;

a downcomer means connected to said filter means and extending towards the ground, said downcomer means having an inner diameter sufficiently large to spontaneously vent any gases which are formed in the chemical solution back through said filter means and into said vessel;

a standpipe means to regulate changes in the flow of the chemical solution;

a tubular connecting means to connect said downcomer means and said standpipe means so that the chemical solution flows therebetween, said tubular connecting means initially determining the flow rate of the chemical solution;

a tubular conveyance means attached to said standpipe means to convey the chemical solution to a selected location in or above the liquid body.

2. An automatic and continuous chemical feed system as in claim 1 wherein said filter means is positioned at an angle from the horizontal to aid in venting gases which are formed in the chemical solution back through the vessel.

3. An automatic and continuous chemical feed system as in claim 2 wherein said filter means is positioned at an angle of at least about 30° from the horizontal.

4. An automatic and continuous chemical feed system as in claim 1 wherein said downcomer means has an inner diameter greater than about ¼".

5. An automatic and continuous chemical feed system as in claims 1 or 4 wherein said downcomer means has an inner diameter of about ⅜".

6. An automatic and continuous chemical feed system as in claim 1 wherein said standpipe means has a series of holes drilled at various heights therein to allow the position of the tubular connecting means to be adjusted, thereby regulating the flow of the chemical solution.

7. An automatic and continuous chemical feed system as in claim 6 wherein said holes are drilled at an angle of about 10° from the horizontal to aid the flow of the chemical solution.

8. An automatic and continuous chemical feed system as in claim 1 wherein said standpipe means has a slot at the upper end thereof to allow the position of the tubular connecting means which is inserted therethrough to be adjusted, thereby regulating the flow of the chemical solution.

9. An atuomatic and continuous chemical feed system as in claim 1 wherein said tubular conveyance means is provided with an anti-clogging nozzle to permit the introduction of a scale-forming chemical solution below the surface level of the liquid body.

10. An automatic and continuous chemical feed system as in claim 9 wherein said anti-clogging nozzle is a 90° elbow which is attached and sealed at one end to the tubular conveyance means such that the elbow is oriented in an upward direction with the opening therein horizontal to the surface of the liquid body.

11. An automatic and continuous chemical feed system for the introduction of a chemical solution into a swimming pool or spa comprising:

a vessel for containing the chemical solution to be introduced into the swimming pool, said vessel being vented to maintain atmospheric pressure and being fixably positioned such that the level of the chemical solution in the vessel is above the high water level of the pool or spa, said vessel also having an opening near the base thereof;

a filter means for filtering said chemical solution as the solution flows out of the vessel, said filter means being positioned at an angle of at least about 30° from the horizontal to aid in venting gases formed in the chemical solution back through the vessel;

a downcomer means which is connected to said filter means and which extends towards the ground, said downcomer means having an inner diameter sufficiently greater than about ¼" such that gases formed in the chemical solution spontaneously vent back through said filter means and into said vessel;

an adjustable standpipe means having a series of holes drilled vertically therein at an angle of about 10° from the horizontal to permit changes in the rate of flow of the chemical solution to be regulated;

a tubular connecting means to connect said downcomer means and said standpipe means, the end of the tubular connecting means which is connected to the standpipe means being positioned in one of the holes drilled therein, said tubular connecting means initially determining the flow rate of the chemical solution;

a tubular conveyance means attached to said standpipe means to convey the chemical solution to a selected location in the swimming pool.

12. An automatic and continuous chemical feed system as in claims 11 or 14 wherein said tubular conveyance means is provided with an anti-clogging nozzle to permit the introduction of a scale-forming chemical solution below the surface level of the swimming pool.

13. An automatic and continuous chemical feed system as in claim 12 wherein said anti-clogging nozzle is a 90° elbow which is attached and sealed at one end of the tubular conveyance means such that the elbow is oriented in an upward direction with the opening therein horizontal to the surface of the swimming pool.

14. An automatic and continuous chemical feed system for the introduction of a chemical solution into a swimming pool or spa comprising:

a vessel for containing the chemical solution to be introduced into the swimming pool, said vessle being vented to maintain atmospheric pressure and being fixably positioned such that the level of the chemical solution in the vessel is above the high water level of the pool or spa, said vessel also having an opening near the base thereof;

a filter means for filtering said chemical solution as the solution flows out of the vessel, said filter means being positioned at an angle of at least about 30° from the horizontal to aid in venting gases formed in the chemical solution back through the vessel;

a downcomer means which is connected to said filter means and which extends towards the ground, said downcomer means having an inner diameter sufficiently greater than about ¼" such that gases formed in the chemical solution spontaneously vent back through said filter means and into said vessel;

a standpipe means having a slot at the upper end thereof to permit changes in the rate of flow of the chemical solution to be regulated;

a tubular connecting means to connect said downcomer means and said standpipe means, the end of the tubular connecting means which is connected to the standpipe means being inserted through said slot such that the position of the tubular connecting means inside the standpipe means can be adjusted, said tubular connecting means initially determining the flow rate of the chemical solution;

a tubular conveyance means attached to said standpipe means to convey the chemical solution to a selected location in the swimming pool.

* * * * *